E. OLIVER.
WHEEL RIM.
APPLICATION FILED SEPT. 18, 1916.
1,248,386.
Patented Nov. 27, 1917.
2 SHEETS—SHEET 1.
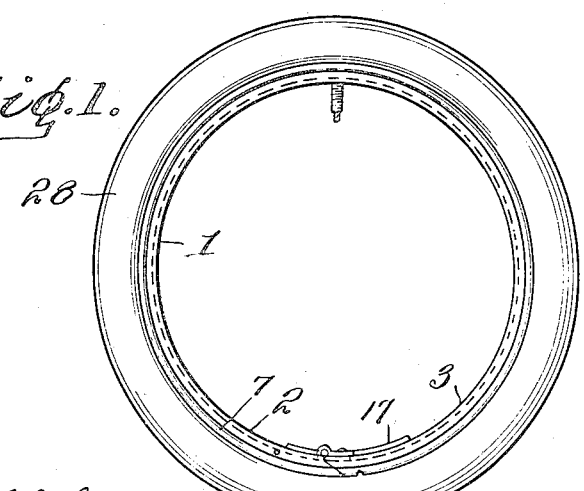
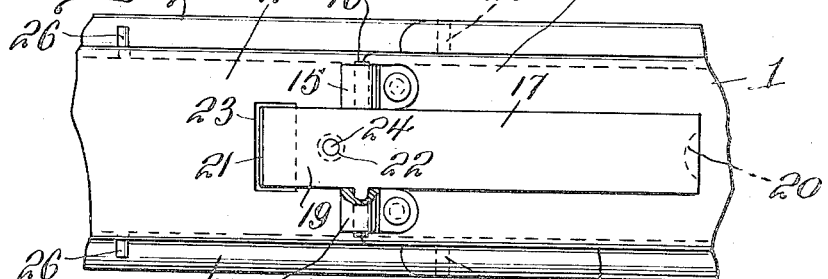
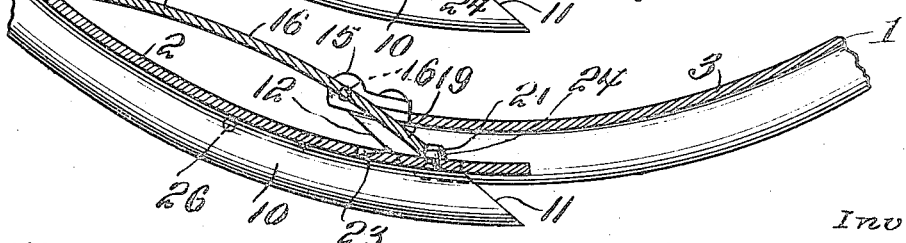
Witnesses
W. H. Lybrand
E. M. Springer
Inventor
Elmer Oliver
By [signature]
Attorney

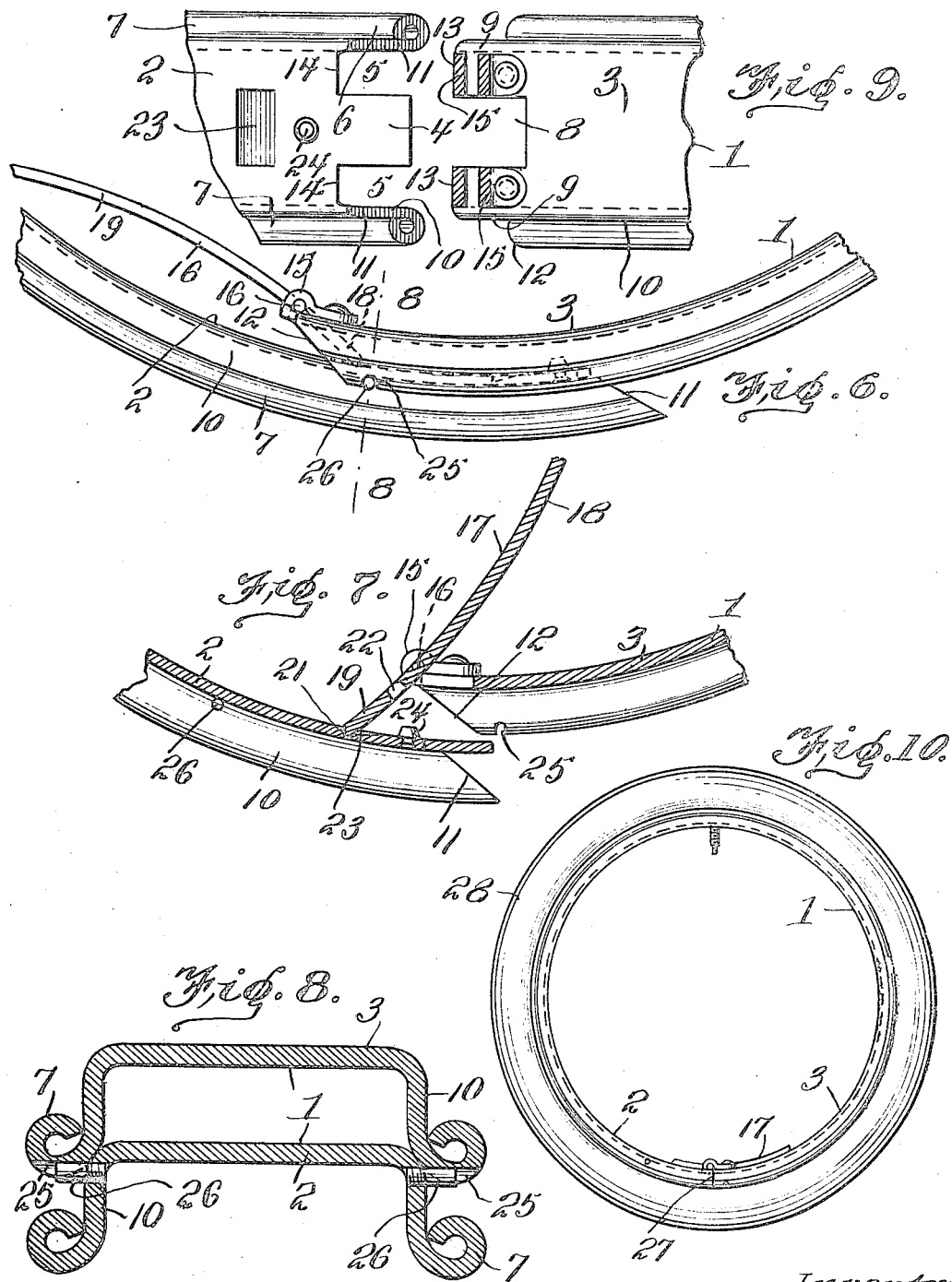

UNITED STATES PATENT OFFICE.

ELMER OLIVER, OF DAYTONA, FLORIDA.

WHEEL-RIM.

1,248,386.  Specification of Letters Patent.  Patented Nov. 27, 1917.

Application filed September 18, 1916. Serial No. 120,683.

*To all whom it may concern:*

Be it known that I, ELMER OLIVER, a citizen of the United States, residing at Daytona, in the county of Volusia and State of Florida, have invented certain new and useful Improvements in Wheel-Rims, of which the following is a specification.

This invention relates to improvements in wheel rims, and particularly to split rims of the demountable type commonly employed upon automobile wheels.

The primary object of the invention is to provide simple, reliable and efficient means, forming part of the rim, for expanding and contracting the same for a ready and convenient application and removal of the tire.

A further object of the invention is to provide a split rim embodying contracting and expanding means including an operating lever and means coöperating therewith for securing expanding and contracting movements in an easy and convenient manner and without the exercise of material force on the part of the operator.

A still further object of the invention is to provide means for locking the operating lever in normal position to hold the rim expanded, and for bracing the rim ends when fully expanded to relieve the lever and locking connections from any tendency to displacing strains.

A still further object of the invention is to provide means for locking the rim ends when fully contracted, so that the rim may be held contracted as long as desired for the convenience of the operator in applying and removing tires by successive operations or at different periods.

A still further object of the invention is to provide a split rim and operating means of the character described for expanding and contracting the same whereby the rim, when expanded, will be firmly and strongly secured along the region of the cleft and the operating means disposed in a compact and out of the way or non-interfering position.

With these and other objects in view, the invention consists in the features of construction and the combination and arrangement of parts which will be hereinafter fully described, defined in the appended claims, and illustrated in the accompanying drawings, in which:

Figure 1 is a side elevation of a wheel rim embodying my invention, showing the same expanded for use and with a tire applied thereto;

Fig. 2 is a view on an enlarged scale looking toward the inner side of the connected ends of the rim;

Fig. 3 is a vertical longitudinal section through the rim ends and the operating and locking lever;

Fig. 4 is a view similar to Fig. 3, showing the lever moved to release the rim ends from engagement and in position for the first contracting movement beyond the normal lap of the rim ends under the resiliency of the rim when said rim ends are disconnected;

Fig. 5 is a view similar to Fig. 3, showing the lever thrown to contract the rim on the first contracting motion;

Fig. 6 is a view in side elevation showing the rim ends moved for a full contracting action and locked in contracted condition;

Fig. 7 is a view similar to Fig. 4 and illustrating the action of the lever in expanding the rim ends back to normal engaging position;

Fig. 8 is an enlarged detail cross section on the line 8—8 of Fig. 6;

Fig. 9 is a view similar to Fig. 2 of the rim ends separated, the operating lever detached and the pivot knuckles in section, and illustrating the contraction of the rim ends *per se;* and Fig. 10 is a view similar to Fig. 1 showing the adaptation of the invention to a rim having a straight transverse split.

Referring to the drawings, 1 designates a demountable rim of the split ring type, being severed transversely at a point in its circumference to provide opposing end portions 2 and 3 which, when the rim is expanded for use, have abutting and engaging contact, as shown clearly in Figs. 1, 2 and 3. In the form of my invention shown in detail in Figs. 1 to 7, inclusive, the rim ends are provided with interengaging surfaces to reinforce the joint against vertical and transverse strains, to which purpose the end 2 is formed with a central tongue or projection 4 and side recesses 5 between the same and the projecting portions 6 of the rim beads 7 at such end of the rim, while the end 3 is formed with a central slot or recess 8 to receive the tongue 4 and with side projections 9 to fit within the recesses 5, when the rim ends are in abutting engagement, to hold said rim ends against lateral disconnection and displacement. As shown, the bead projections 6 on the rim end 2 are adapted to extend on opposite sides of the projections 9 on the rim end 3, and the respective rim ends have the terminal portions of their beads and side flanges 10 formed with lapping beveled surfaces 11 and 12, respectively, to form a scarf-joint which reinforces the rim ends against vertical strains. In accordance with my invention, I also provide the body portions and flanges of the rim ends with squared inner abutment surfaces 13 and 14, respectively, which are adapted for engagement with each other at a point radially inward of the beveled abutment surfaces to hold the rim ends against relative inward shifting movement and contraction and to reinforce the locking connection between the rim ends when expanded, as hereinafter fully described.

The projections 9 of the rim end 3 are suitably formed or provided with knuckles 15 to receive a transverse pivot or pintle pin 16, upon which is hingedly or pivotally mounted an operating lever 17. This lever 17 is longitudinally curved to conform to the curvature of the rim and normally lies against the surface of the rim and across the joint between the rim ends when the rim is expanded, as shown in Figs. 1, 2 and 3. The lever is pivotally mounted adjacent one end so as to provide a long operating arm 18 and a relatively shorter prying arm 19, the former having a finger-nail recess or its equivalent 20 and the latter having a beveled extremity 21 and a tapered locking or keeper opening 22 arranged at a point between the said end 21 and the pivot 16. The end 21 of the lever is adapted for engagement with a ratchet tooth-shaped recess 23 in the rim end 2 and with a tapered locking pin or stud 24 on said rim end, which pin or stud is adapted to engage and interlock with the tapered opening 22 when the parts are in normal position to lock the lever and connected ends of the joint against spreading motion. When the parts are in normal position the abutment surfaces 13 and 14 also coöperate with the locking connection between the lever and rim end 2 to resist separating motion of the rim ends and to relieve the lever and locking connection from both vertical and spreading strains, whereby the strength of the joint is increased and any tendency to an unlocking motion of the lever or separation of the parts effectually overcome. The recess 22 permits of the ready insertion of a finger beneath the end of the arm 18 of the lever for the purpose of raising the lever so that it may be grasped and operated for a rim-releasing and contracting action, as hereinafter fully described. At a suitable distance inwardly from the pivot of the lever the beads of the rim end 3 are formed with locking notches or recesses 25 to receive and engage with locking pins or studs 26 disposed on the rim end 2 at a suitable distance inwardly from the tongue 4, whereby the rim ends may be connected to lock the rim in contracted condition after full retraction thereof, so that the rim may be held contracted as long as desired for greater convenience in applying or removing a tire. It will of course be understood that the rim may be adapted for clencher, straight side or other types of tires.

In the modified form of my invention shown in Fig. 10 the ends of the rim are pivoted upon a straight transverse line so as to form straight transverse abutment surfaces 27, the beveled surfaces 11 and 12 being dispensed with, but the construction is otherwise the same.

Figs. 1 and 10 show a tire 28 applied to a fully expanded and locked rim, and also show the operating lever and coöperating parts in normal position. When it is desired to contract the rim for the removal of the tire 28 and its subsequent application or replacement by another tire, the long arm 18 of the lever 17 is engaged and swung inwardly on the fulcrum 16, with the result that the arm 19 of the lever is forced outwardly, thus moving the rim end 2 out of engagement with the rim end 3, so that, under the normal resiliency of the rim, the said rim end 2 will project under and in slight lapping engagement with relation to the rim end 3, as shown, for example, in Fig. 7. The rim ends thus being preliminarily separated, a continued forward movement of the lever arm 18 is exerted, with the result that the end of the arm 19 slides out of the recess 23, over the inclined wall thereof, and into engagement with the tapered pin 24, as shown in Fig. 4, which serves as an abutment by means of which a preliminary contracting motion may be imparted to the rim ends to shift the same to the position shown in Fig. 5, in which the lever arm 18 is moved forward to its fullest extent over the rim end 2 and the lever arm 19 is moved to the fullest extent allowed within the slot 8 beneath the rim end 3, in which position, owing to the fact that the lever is thrown forward beyond center, the rim ends will be held to maintain the rim in a partly contracted condition. The operator then by inward pressure of the hands or otherwise on the opposite sides of the rim forces the rim ends further into lapping engagement until the recesses 25 and studs 26 come into register and interlock, whereupon the rim will be held locked in a fully contracted condition to permit of the easy and convenient removal of the tire and its subsequent application or the application of a new tire. It will be understood that the rim may be held in this contracted condition for any desired period for greater convenience in applying and removing tires without the use of tools or operating devices of any character, whereby increased convenience to the operator is afforded.

In expanding the rim again into engagement with the tire to hold the tire in position, the rim end 2 is depressed to release the studs 26 from engagement with the recesses 25, whereupon the rim ends will return by the contractile energy of the rim to the position shown in Fig. 7. The operator then engages the end 21 of the arm 19 of the lever 17 with the straight shoulder of the recess 23 and exerts pressure on the lever arm 18 to move said arm back to normal position, by which operation the rim ends will be expanded again into fully spread and abutting engagement, the tongue 4 moving into the recess 8 and the stud 26 again engaging the opening 22 to lock the rim ends in expanded position and the lever in normal position, as previously explained.

From the foregoing description, taken in connection with the drawings, the construction and mode of operation of my improved split demountable rim will be readily understood, and it will be seen that the invention provides a rim which embodies, as part thereof, simple and effective means for contracting and expanding it, as well as for locking it in contracted as well as other positions, and for reinforcing the joint and locking an operating lever against both lateral and vertical strains, with obvious advantages. Furthermore, it will be seen that the operating lever when in normal position lies in close proximity to the inner surface of the rim, thus avoiding the use of bulky and cumbersome parts or other attachments presenting an unsightly or otherwise objectionable appearance. The invention also provides a type of contracting and expanding means which may be operated with great ease and convenience and which entirely dispenses with the use of auxiliary tools or devices for the purpose. Other advantages and conveniences of the invention will be readily understood by those versed in the art.

From the foregoing description, taken in connection with the accompanying drawings, the construction and operation of the herein described wheel rim will be readily apparent, and, therefore, further explanation has been omitted.

I claim as my invention:

1. A split demountable rim embodying means for expanding and contracting the rim, and auxiliary means included in the rim structure for interlocking the rim ends in rim contracted condition.

2. A split demountable rim having its end portions respectively provided with interlocking projections and recesses to lock the rim ends in rim contracting position.

3. A split demountable rim having one of its end portions provided with a central slot, a lever hingedly connected with the side walls of said slot and having a long arm and a short arm, the short arm being movable in said slot, and an abutment member upon the other end of the rim for engagement by the short arm of the lever to contract the rim, said lever being foldable down upon the inner surface of the rim and having an opening therein to interlock with said abutment when the rim ends are in normal rim expanding position.

4. A split demountable rim comprising a rim body provided upon one of its ends with a pair of spaced engaging members, and an expanding and contracting lever pivotally mounted upon the other end of the rim, said lever being engageable with the first named rim end to initially separate the rim ends, engageable with one of said engaging members to contract the rim ends and engageable with the other engaging member to expand the rim ends.

5. A split demountable rim comprising a rim body provided upon one of its ends with a pair of spaced engaging members, and a lever upon the other rim end operative to engage the first named rim end for separating said rim ends by movement radially of the rim, and engageable with one of said engaging elements to circumferentially contract the rim and with the other engaging element to expand the rim back to normally expanded position, said lever being adapted for engagement with one of said rim elements to lock the rim ends together to maintain the rim in expanded condition.

6. A split demountable rim comprising a rim body having a locking member on one of its end portions and a contracting and expanding lever mounted upon its other end portion, said lever being adapted for engagement with said locking member to hold the rim ends in locking position, beveled abutment surfaces at the sides of the rim end and straight abutment surfaces upon the central portions of the rim ends operating with said beveled abutment surfaces to prevent relative longitudinal movement of said rim ends, whereby to relieve the locking connection of strain in a direction circumferential of the rim.

7. A split demountable rim comprising a rim body having one of its end portions provided with a recess and a stud in spaced relation to each other, and having its other end portion provided with an expanding and contracting lever engageable respectively with said stud and recess for rim contracting and expanding actions.

8. A split demountable rim comprising a rim body having one of its end portions provided with a recess and a stud disposed in spaced relationship, and an expanding and contracting lever mounted upon its other end portion and engageable with said stud and recess for rim contracting and expanding actions respectively, and also engageable with said stud to lock the rim ends in fully expanded position.

9. A split demountable rim comprising a rim body having a stud and a recess upon one of its ends arranged in spaced relationship, and a lever upon its opposite end respectively engageable with said stud and recess for rim expanding and contracting actions, the rim ends being provided with engaging elements to lock the same in a final contracting action to a degree greater than that afforded by the action of the aforesaid expanding and contracting means.

10. A split demountable rim comprising a rim body having one of its end portions provided with a central tongue and side recesses and its other end portion provided with a central recess to receive said tongue and side projections to engage said recesses, the first named end of the rim being provided with a stud and a recess arranged in spaced relationship, and a lever upon the second named end of the rim having an arm movable in the recess therein and operative to engage the stud for a contracting action and the recess for an expanding action of the rim, said rim ends being further provided with interlocking projections to lock said rim ends in a further condition of contraction.

11. A split demountable rim comprising a rim body having spaced engaging members upon one of its ends, and a lever upon its opposite end engageable respectively with said engaging members for rim expanding and contracting actions, said lever being constructed to interlock with one of said engaging members when the rim ends are brought together and the rim fully expanded.

12. A split demountable wheel rim having one of its end portions provided with a central slot, and projections on opposite sides of said slot, and having its flanges cut away so as to terminate in the rear of said projections, and having its other end portion provided with a central tongue to enter said slot, recesses on opposite sides of said tongue to receive said projections, and having its side flanges projecting forwardly to extend on opposite sides of said projections, the side flanges of the rim ends being beveled to form a scarf joint, and the inner end walls of the slots and recesses being straight or vertical to form square abutment surfaces, and means coöperating with the rim ends for expanding and contracting them and also locking them together.

In testimony whereof I affix my signature in the presence of two witnesses.

ELMER OLIVER.

Witnesses:
A. E. DONNELLY,
P. W. HART.